(12) United States Patent
Sievert

(10) Patent No.: US 6,721,942 B1
(45) Date of Patent: Apr. 13, 2004

(54) COMPONENT OBJECT MODEL INTERFACE TO C++ TYPE CONVERSION

(75) Inventor: James A. Sievert, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/540,258

(22) Filed: Mar. 31, 2000

(51) Int. Cl.[7] .................................................. G06F 9/45
(52) U.S. Cl. ........................ 717/137; 717/124; 717/116; 717/164; 717/165; 717/167; 719/329
(58) Field of Search .................................. 717/136–160, 717/116, 124, 162–167; 719/316, 328–331; 709/201, 316

(56) References Cited

U.S. PATENT DOCUMENTS 5,732,270 A * 3/1998 Foody et al. ................ 709/316
6,134,559 A * 10/2000 Brumme et al. ............. 707/103
6,167,565 A * 12/2000 Kanamori ................... 717/146
6,347,342 B1 * 2/2002 Marcos et al. .............. 709/315

OTHER PUBLICATIONS

David Button, Interfacing Ada 95 to Microsoft COM and DCOM Technologies, pp. 9–14.*

* cited by examiner

*Primary Examiner*—Tuan Dam
*Assistant Examiner*—Chuck Kendall
(74) *Attorney, Agent, or Firm*—Charles A. Johnson; Mark T. Starr; Crawford Maunu PLLC

(57) ABSTRACT

Methods for converting from a COM interface pointer to an underlying C++ object are described in various embodiments. In the various embodiments, classes are constructed in support of the underlying C++ object. The classes are used to enforce rules safely convert a COM interface pointer. One rule is that a COM interface to be converted cannot be marshaled. A second rule is that an object requesting the C++ object must have legal access to the COM interface (for example, the same execution unit). A third rule is that the object type of the COM interface must be in the inheritance hierarchy of the C++ object.

21 Claims, 4 Drawing Sheets

COMPONENT OBJECT MODEL INTERFACE TO C++ TYPE CONVERSION

FIELD OF THE INVENTION

The present invention generally relates to the Component Object Model (COM), and more particularly to the conversion of COM interfaces to underlying C++ objects.

BACKGROUND OF THE INVENTION

The Component Object Model (COM) is a software architecture that supports reuse of software components between different application programs written in different languages. Reusing software components, where appropriate, reduces the cost of creating a new application as compared to creating an application from scratch. COM addresses the issues of interoperability where reuse is desirable for binary executables that are created by different entities in different languages.

In COM, a "component" is a piece of compiled code that provides one or more services. It will be appreciated that even though a component is also an object in object oriented programming (OOP) terms, the term "component" will be used herein to avoid confusion with other objects in general. An "interface" is the mechanism through which components interact and through which software in general accesses the services of a component. The interface defines the behavior and responsibilities of the component. In other words, the interface is a group of related functions and forms the binary standard or contract through which the component is accessed.

A COM interface is not a class and cannot be instantiated by itself. A COM component must implement the interface, and the component must be instantiated for the interface to exist. It will be appreciated that the same interface can be implemented in different ways by different components with the restriction that each component must satisfy the interface's behavior and responsibilities.

In some applications there is an active relationship between COM objects. For example, a first COM interface method may take a reference to another COM object as input. This reference is used to identify the COM object against which direct action will take place. In addition, a method of a first interface of a first COM object may be accessed in an interface method of a second COM object. It will be appreciated, however, that there may be certain classes of clients for which access to the method of the first interface is undesirable.

One solution to protect attributes of the COM object (for example, the method of the first interface) is to implement a third COM interface that includes the desired attributes. This third COM interface wouldn't be documented to normal clients and would only be used internally. This solution, however, suffers from the fact that industrious COM clients could get access to the third COM interface. The rules of COM dictate that an object must indicate, on demand, whether or not it supports a given interface. An object cannot discriminate between types of clients over time when deciding what interfaces it supports. Thus, the third COM interface could be discovered and used by client for which its use was unintended.

A method that addresses the aforementioned problems, as well as other related problems, is therefore desirable.

SUMMARY OF THE INVENTION

In various embodiments, the invention provides methods and apparatus for converting from a COM interface pointer to an underlying C++ object. In the various embodiments, classes are constructed in support of the underlying C++ object. The classes are used to enforce rules that allow one to safely convert a COM interface pointer. One rule is that a COM interface to be converted cannot be marshaled. A second rule is that an object requesting a C++ object must have legal access to the COM interface (for example, the same execution unit). A third rule is that the object type of the COM interface must be in the inheritance hierarchy of the C++ object.

In one embodiment, a COM object is instantiated having a first interface referenced with a first interface pointer and a raw interface. The COM object is implemented as a first object of a C++ class that has a public conversion method. The conversion method, responsive to an input of the first interface pointer, returns a resultant pointer to the first object if the COM object supports the raw interface, the raw interface has not been marshaled, and the execution unit that implements the COM object referenced by the first interface pointer is the same execution unit performing the conversion method.

In another embodiment, a COM object is instantiated having a first interface pointer. The COM object is implemented as a first object of a first C++ class, which has a public conversion method and a private registry attribute. The private registry attribute maps an interface pointer of the COM object to an associated pointer to the first object. Responsive to an interface pointer of the COM object that is input to the conversion method, the associated pointer to the first object is returned.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
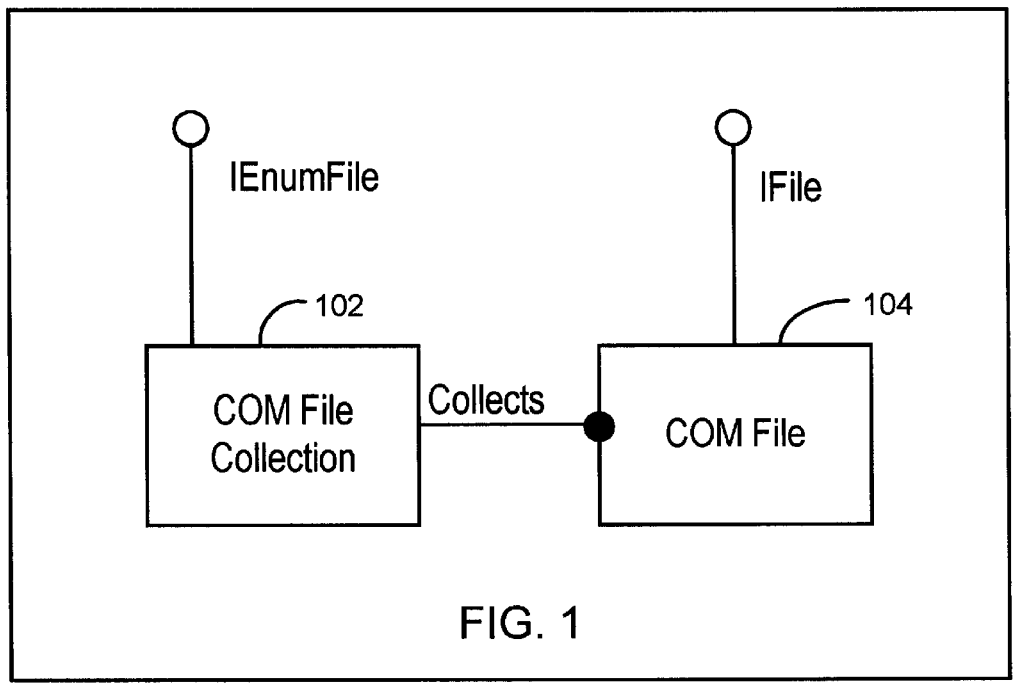
FIG. 1 models a relationship between a COM File Collection that enumerates COM File objects.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of object-oriented applications. The invention has been found to be particularly applicable and beneficial or applications written in C++ for the Component Object Model. While the present invention is not so limited, an appreciation of the present invention is presented by way of specific examples of C++ code.

In general, a single COM execution unit (a DLL or EXE) can serve or support multiple COM object types. The organization of COM object types within a single COM execution unit originates because of an association between the domain objects modeled by the COM object types. For example, a single COM DLL may support a COM object type representing a problem domain concept. The same COM DLL may support another COM object type that enumerates those problem domain objects. The organization of these two COM object types within the same COM DLL stems from the logical association between an object and a collection of those objects. FIG. 1 models a relationship of a COM File Collection 102 that enumerates COM File objects 104. IEnumFile is the COM interface for the COM File Collection object, and IFile is the COM interface for the COM File object.

In some applications, the association between two COM object types represents an active relationship between those two COM object types. That is, a given COM interface method call may take a reference to another COM object as input. This reference is used to identify the COM object against which direct action will take place. In COM parlance, this reference is an interface type, not a class type as in C++.

Figure 2:
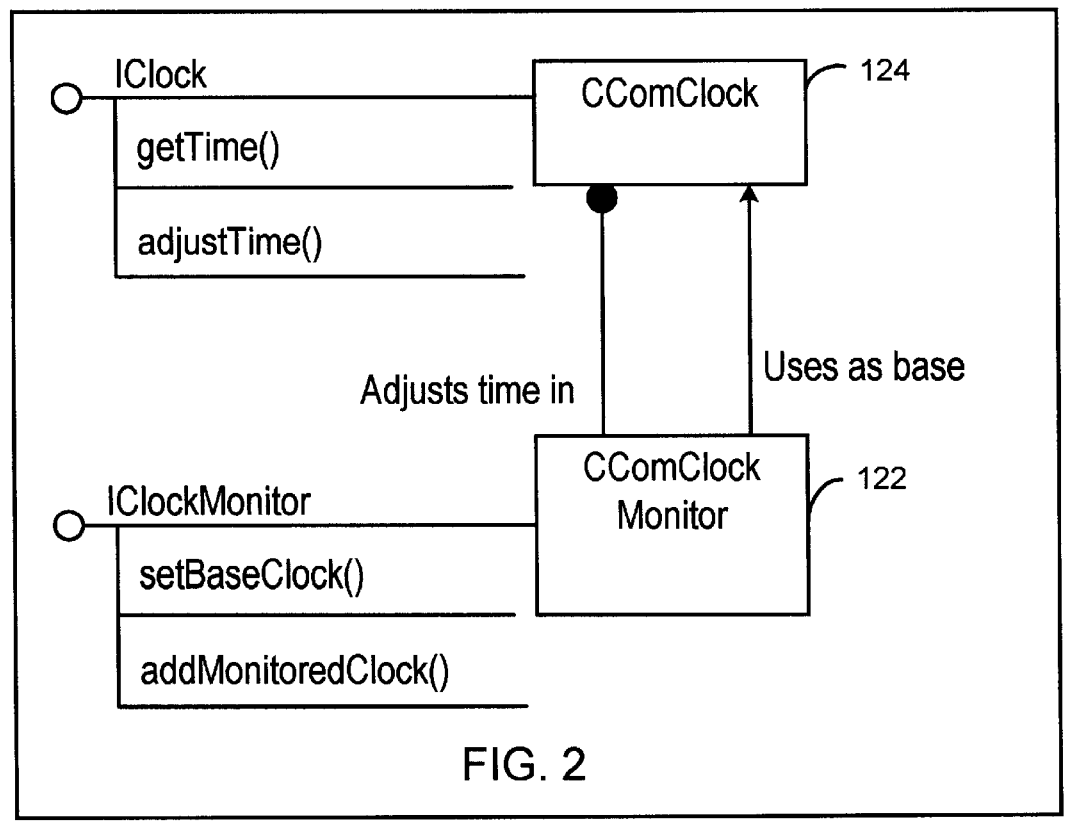
FIG. 2 illustrates an example method of an interface of a target COM.
Figure 3:
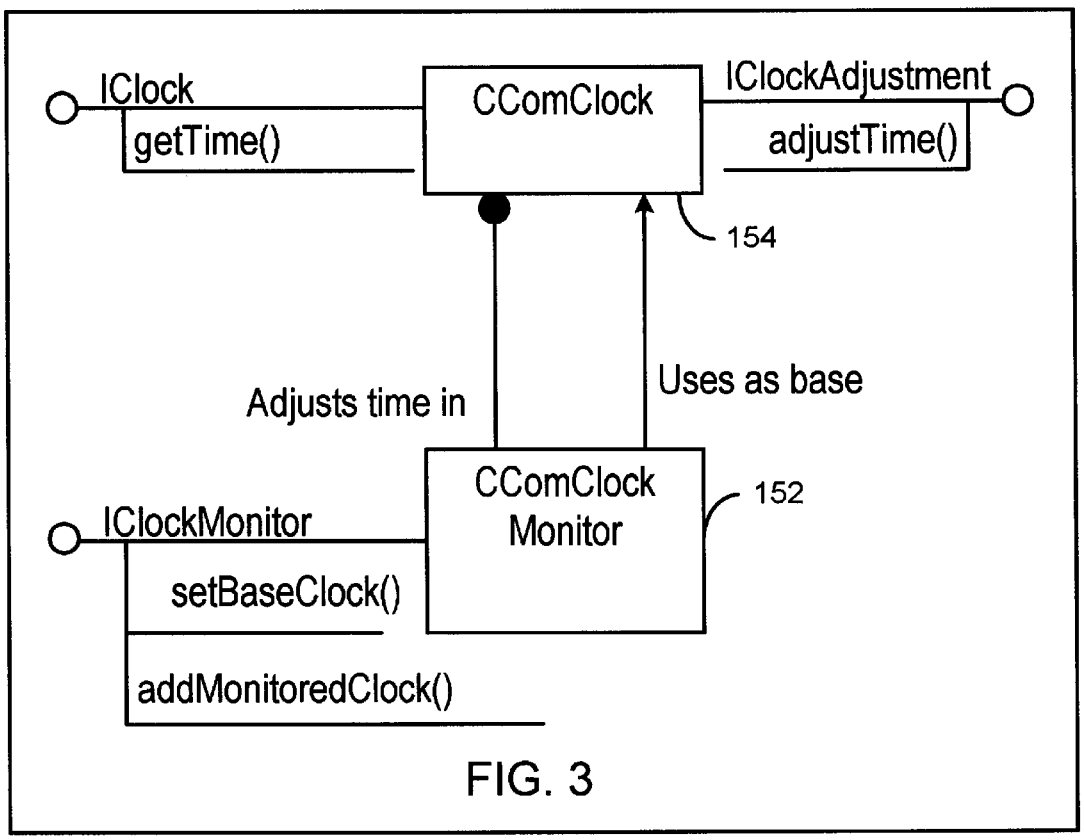
FIG. 3 illustrates factoring adjustTime( ) into interface, IClockAdjustment, which attempts to allow exclusive use by a CComClockMonitor.

There are three techniques by which direct action may be initiated between two COM objects. The first technique uses a normal method call on an interface of a target COM object. The second technique includes a "protected" interface of the target COM object, wherein the "protected" interface includes the method. The third technique involves making the method a public method of the C++ class that implements the target COM object. The first two techniques are illustrated in FIGS. 2 and 3, respectively, and the third technique is described in FIGS. 4, 5, and 6. The description of the first two techniques is provided as background information for the present invention.

FIG. 2 illustrates an example method of an interface of a target COM. A CComClockMonitor 122 is given a CComClock 124 that the CComClockMonitor uses to obtain a base time. Other CComClock objects can be added to the CComClockMonitor. The CComClockMonitor will adjust the time in these other CComClock objects based on the time read from the base CComClock. The CComClockMonitor adjusts the time of the CComClock objects through the IClock::adjustTime( ) method. It can be seen in this technique that the adjustTime( ) method is not only available to the CComClockMonitor methods, but also to other methods having access to the IClock interface.

It will be appreciated that in some applications the IClock::adjustTime( ) method should not be accessible to a certain class of clients. For example one class of clients may be limited to getting the current time with the getTime( ) method. It may be desirable to limit the adjustTime( ) method for use by a CComClockMonitor. The second technique is illustrated by limiting access to the adjustTime( ) method.

FIG. 3 illustrates factoring adjustTime( ) into interface, IClockAdjustment, which attempts to allow exclusive use by a CComClockMonitor 152. That is, implementers do not document IClockAdjustment for use by external clients. In theory, CComClockMonitor changes the time of a CComClock 154 via IClockAdjustment::adjustTime( ), while other clients are limited to getting the time of a CComClock via IClock::getTime( ). Realistically, access to the IClockAdjustment interface can't be limited to selected clients using COM programming techniques. As a result, this interface factoring technique is not a foolproof solution.

Figure 4:
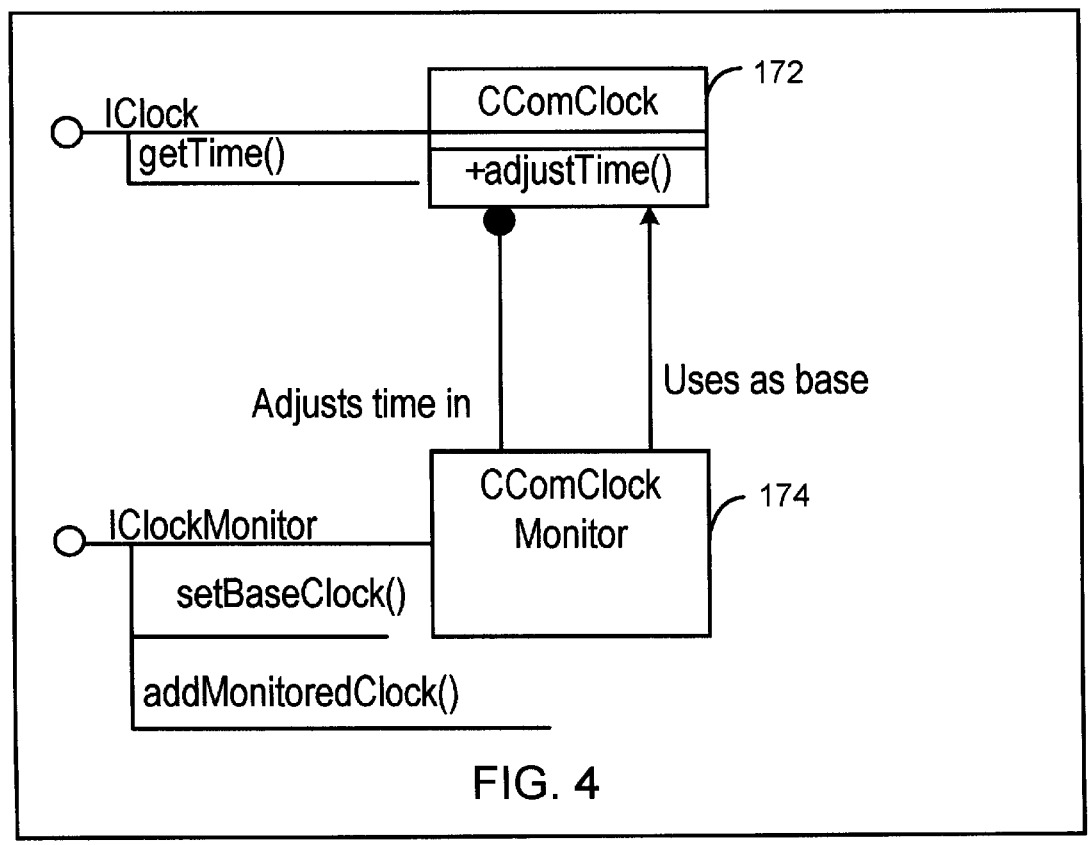
FIG. 4 shows adjustTime( ) as a public member of the CComClock class, which illustrates a technique by which direct action may be initiated between two COM objects.

FIG. 4 shows adjustTime( ) as a public member of the CComClock class 172, which illustrates the third technique by which direct action may be initiated between two COM objects. It can be seen that the third technique eliminates the need for the IClockAdjustment interface by making adjusttime( ) a public method of the C++ class that implements CComClock. When a caller adds a CComClock as a monitored clock to a CComClockMonitor 174 through IClockMonitor::addMonitoredClock( ), an IClock pointer is given as the identity of the CComClock to be monitored.

The third technique is attractive because it does not expose interfaces and methods that are strictly for internal use. As a result, clients can be restricted to calling only a limited set of methods. Furthermore, parameters to and from adjustTime( ) are not limited to the set of types supported by COM. The complete C++ type system is available for input and output parameters. In general, the C++ type system provides a richer set of data types than that of COM.

Two rules must be adhered to in implementing COM objects in accordance with the present invention. By adhering to these rules, COM interface pointers can be safely converted to and manipulated using their underlying C++ object types. The first rule is that an interface to be converted must never be marshaled, and the second rule is that the interface must be legal and viable. The two rules are explained in more detail below.

When COM marshals an interface, it establishes a COM interface proxy. This interface proxy provides the exact binary representation of the interface being marshaled. An interface proxy acts as an intermediary for interface calls that cross machine, process, and/or COM apartment boundaries. As described by Microsoft:

> An "apartment" has several inter-related aspects. First, it is a logical construct for thinking about concurrency, such as how threads relate to a set of COM objects. Second, it is a set of rules programmers must obey to receive the concurrency behavior they expect from COM environment. Finally, it is system-supplied code that helps programmers manage thread concurrency with respect to COM objects.
>
> The term "apartment" comes from a metaphor in which a process is conceived as a totally discrete entity, such as a "building" that is subdivided into a set of related but different "locales" called "apartments." An apartment is a "logical container" that creates an association between objects and, in some cases, threads. Threads are not apartments, although there may be a single thread logically associated with an apartment in the STA model. Objects are not apartments, although every object is associated with one and only one apartment. But apartments are more than just a logical construct; their rules describe the behavior of the COM system. If the rules of the apartment models are not followed, COM objects will not function properly. (http://support.microsoft.com/support/kb/articles/Q150/7/77.asp)

Components and their clients can choose between a COM provided Single Threaded Apartment model and a Multi-threaded Apartment model. An interface proxy presents method invocations in a form consistent with the nature of separation between a caller and the object of the call. In short, when COM marshals an interface, it replaces he C++ implementation object with an interface proxy.

When a reference to a COM object is passed to another COM object during an in-process COM interface method invocation, marshaling is not always necessary. If the two objects reside in the same apartment, or the object having the interface that is being marshaled aggregates the Free-Threaded Marshaler, COM does not create an interface proxy. Instead, COM allows direct access to the underlying C++ object. The Free-Threaded Marshaler provides direct access to a COM interface without having the overhead of an associated proxy. In the event that access to an underlying C++ object is allowed without marshaling, there is risk of data corruption or program exception conditions since there is no interface proxy to enforce the binary representation of the interface.

If a COM to C++ type conversion violates the no-marshaling rule, data corruption may result. The interface proxy that replaces a C++ implementation object for a marshaled interface guarantees the binary representation of the interface, not the underlying state data associated with a C++ implementation object. Thus, the result of casting the interface proxy to a C++ object may create data integrity problems in some cases and program exceptions in other cases.

COM interfaces are syntactic and semantic contracts. As long as the elements of the contract are upheld, any C++ class can theoretically implement any COM interface. For example, the IClockMonitor::addMonitoredClock( ) of FIG. 4 takes as input an IClock interface. As previously discussed, the CComClockMonitor 174, using the third method of initiating direct action on a COM object, attempts to convert the input IClock interface to a CComClock object 172 and subsequently calls CComClock::adjustTime( ). The methods of the interface and the parameters of those methods are the contract. Also, included in the contract are the semantics of a particular method (i.e., what the method will do for the caller given the various parameters). Thus, a conversion from COM to a C++ type must be legal and viable. In order to be legal, an appropriate object must call the underlying C++ object. An object without access to the method should not have access to the interface that is converted. In order to be viable, the object must be in the inheritance hierarchy. By comparing module instances, the legality and viability of the conversion can be determined.

In order to preserve the integrity of the semantic contract between objects, any COM to C++ type conversion must validate that the conversion operation is in fact legal. The importance of validation of the conversion operation is illustrated in the following example. If a caller implements the IClock interface on a C++ object that is not a CComClock and passes the IClock interface to IClockMonitor::addMonitoredClock( ), the CComClock-Monitor will pass control to the first method of the caller's object. Thus, a level of trust between the objects has been violated. That is, the client created an object disguised as an object that should have been originally created by the server.

For example, a bank creates a type of account object with an interface containing a single method called withdraw (amount). The semantics of the withdraw method are such that withdrawal requests cannot exceed the balance of the account. As long as the proper account and interface method are accessed, the account is protected.

Now assume that someone intending to foil the bank security creates a second type of account object with the same binary interface as that of the bank's account object type. Semantically, this second account object type does not validate withdrawal request against the account balance. The results of the bank permitting usage of this second type of account object type could be devastating. Thus, a mechanism is desirable to ensure that when an account interface is provided, the underlying object is not an impostor.

A COM to C++ type conversion must also be viable. For example, in an inheritance hierarchy of COM object types implemented in C++, a COM to C++ type conversion must determine whether or not the target C++ class is part of the inheritance hierarchy. It's possible that a COM interface may be part of an interface hierarchy and hence a possible C++ object implementation hierarchy. If the target C++ class is part of the inheritance hierarchy, the conversion is considered viable.

Given an IClock interface pointer, two mechanisms are described below for obtaining the underlying C++ CCom-Clock object. The first mechanism indexes a collection of CComClock objects based on the IClock interface pointers. The second mechanism casts the IClock interface pointer directly to the underlying C++ CComClock object. Once the underlying C++ CComClock has been obtained, CCom-ClockMonitor adds it to the collection of monitored clocks. After such a conversion, adjustTime( ) is only a public method invocation away from the CComClockMonitor given a C++ CComClock pointer.

Figure 5:
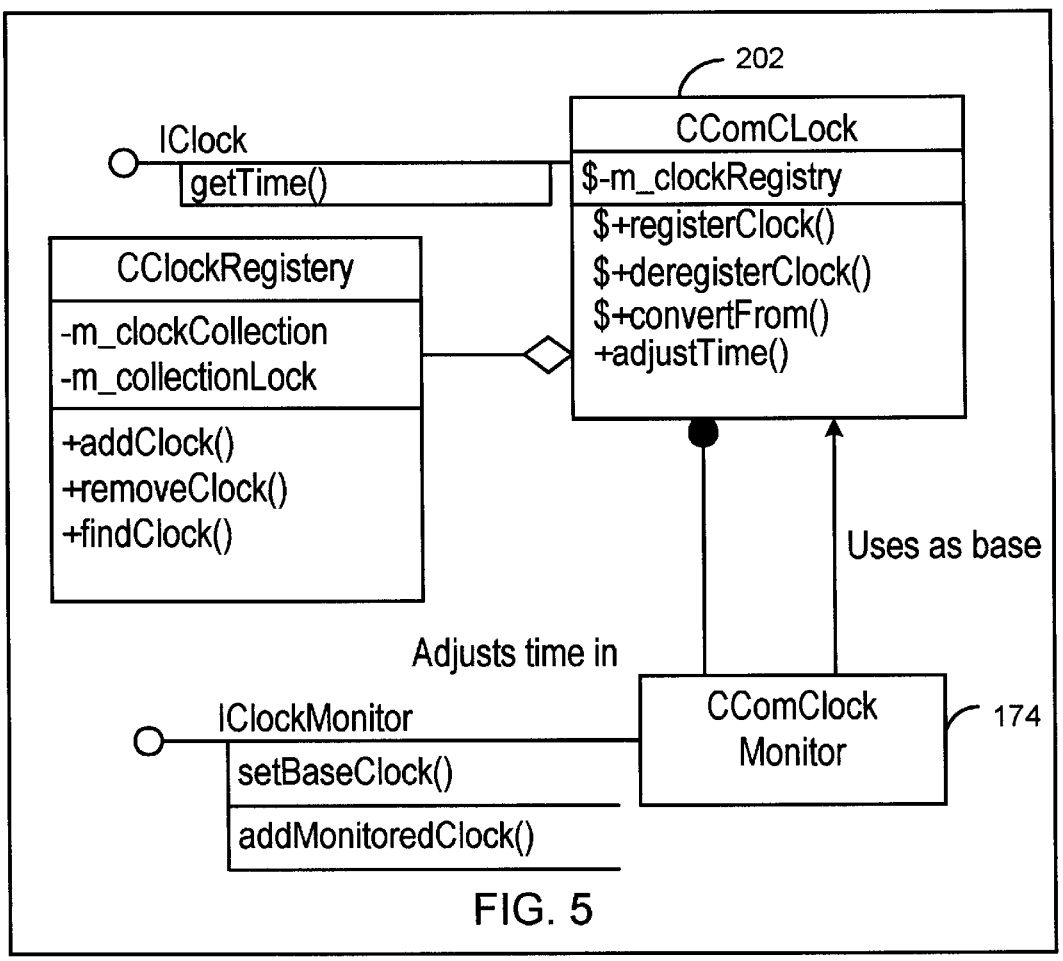
FIG. 5 is an object model diagram that illustrates COM to C++ type conversion using collection indexing, in accordance with one embodiment of the invention.

FIG. 5 is an object model diagram that illustrates COM to C++ type conversion using collection indexing, in accordance with one embodiment of the invention. Collection indexing relies on mapping COM interface pointers to the associated underlying C++ implementation objects. As described below, FIG. 5 adds a number of elements to the object model of FIG. 4.

m_clockRegistry is a private, static attribute of CCom-Clock 202 and is of type CClockRegistry 204. Within CClockRegistry is a private attribute called m_clockCollection that maps IClock interface pointers to their underlying C++ CComClock implementation objects. A Standard Template Library (STL, which is part of C++) map or set object is suitable for the mapping requirements of the pointers and objects, for example.

Methods preceded by "$" are static methods. Static methods are available to all objects. Non-static methods like adjustTime( ) require an object instance to work against, while static methods do not require an object instance.

The attribute, CClockRegistry::m_clockCollection must hold weak references on the IClock interfaces that it collects. A weak reference refers to holding the interface pointer without calling AddRef( ) on it. AddRef( ) is part of the IUnknown interface of COM, which is a fundamental concept in COM. All COM interfaces inherit from IUnknown. IUnknown supports three methods: QueryInterface( ), AddRef( ), and Release( ). The collection holds weak references so that the target objects can be freely destroyed.

Also within CClockRegistry 204 is a private attribute called m_collectionLock. This lock is set while any member of CClockRegistry is accessing m_clockCollection. This lock provides single-threaded access to the underlying clock collection. A Win32 Critical Section would meet the requirements of m_collectionlock, for example. The m_collectionLock attribute prevents two threads of execution from concurrently accessing m_clockCollection.

The public, static methods registerclock( ) and deregisterclock( ) of the CComClock class 202 are methods that are invoked during the CComClock construction and destruction process. These methods register and deregister specific instances of CComClock objects in CComClock::m_clockRegistry. If implemented in ActiveX Template Library (ATL), which is part of the standard Microsoft C++ development environment, convenient locations for calls to CComClock::registerClock( ) and CComClock::deregisterClock( ) are in FinalConstruct( ) and FinalRelease( ), respectively.

CComClock::registerClock( ) takes as a parameter, a reference to the CComClock to be registered. When implemented in ATL, a CComClock inherits from IClock. As such, the CComClock can be entered into CComClock::m_clockRegistry by calling CClockRegistry::addClock( ). CComClock::deregisterclock( ) likewise takes a reference to a CComClock as a parameter. This CComClock is subsequently removed from CComClock::m clockregistry by calling CClockRegistry::removeClock.

A final element necessary for the COM to C++ type conversion is a method to do the conversion. The class object of the target C++ object provides a logical choice for the location of such a conversion method. A public, static method called convertFrom( ) is added to CComClock with the following declaration:

static CComClock *convertFrom( IClock *pIock);

The rationale is that any C++ object within the execution unit of CComClock holding an IClock interface can obtain a CComClock pointer by calling CComClock::convertFrom( ). If conversion is not possible, CComClock::convertFrom( ) returns a NULL CComClock pointer.

Given an IClock pointer, CComClock::convertFrom( ) attempts to find that pointer in CComClock::m_clockRegistry by calling the CComRegistry::findClock( ) method. Because actual IClock pointers are held in CClockRegistry::m_clockCollection, searches based on a marshaled IClock interface will fail. Interfaces represented by proxies will have pointers different from those stored in m_clockCollection. In such a case, CComClock::convertFrom( ) returns a NULL CComClock pointer. A successful search not only returns a valid CComClock pointer, but also guarantees that the conversion is legal and viable because objects entered into CComClock::m_clockRegistry would have come from a registerClock method within the same execution unit and not from an external source.

The collection indexing mechanism for COM to C++ type conversion poses a risk of violating the notion of COM apartments. That is, apartment-threaded COM objects provide no internal synchronization to guard against concurrent object state modification. The COM specification mandates that interfaces of apartment-threaded COM objects must be marshaled across apartment boundaries. The marshaling of interface pointers in this case allows a COM interface proxy to capture each interface method call. This COM interface proxy dispatches simultaneous calls from multiple threads serially to the thread that owns the target COM object. The COM interface proxy provides a synchronization method for use in coordinating concurrent object state modification. When using the collection indexing mechanism, precautions must be taken to ensure that the conversion process does not return a C++ implementation object residing in an apartment different from that of the calling thread, which would conflict with COM apartment rules. The indexing conversion method is generally straightforward to understand and implement. However, the indexing requires a collection of interfaces, and therefore additional storage. In an inheritance hierarchy of C++ implementation classes, the amount of storage increases linearly based on the number of classes in the hierarchy. The scalability of an application by requiring a process-wide lock on the interface collection is also limited with the indexing method.

In another embodiment, casting is used to perform COM to C++ type conversion. While the indexing method has relatively large storage requirements and does not scale particularly well, the casting method eliminates these problems and provides a more general solution.

Figure 6:
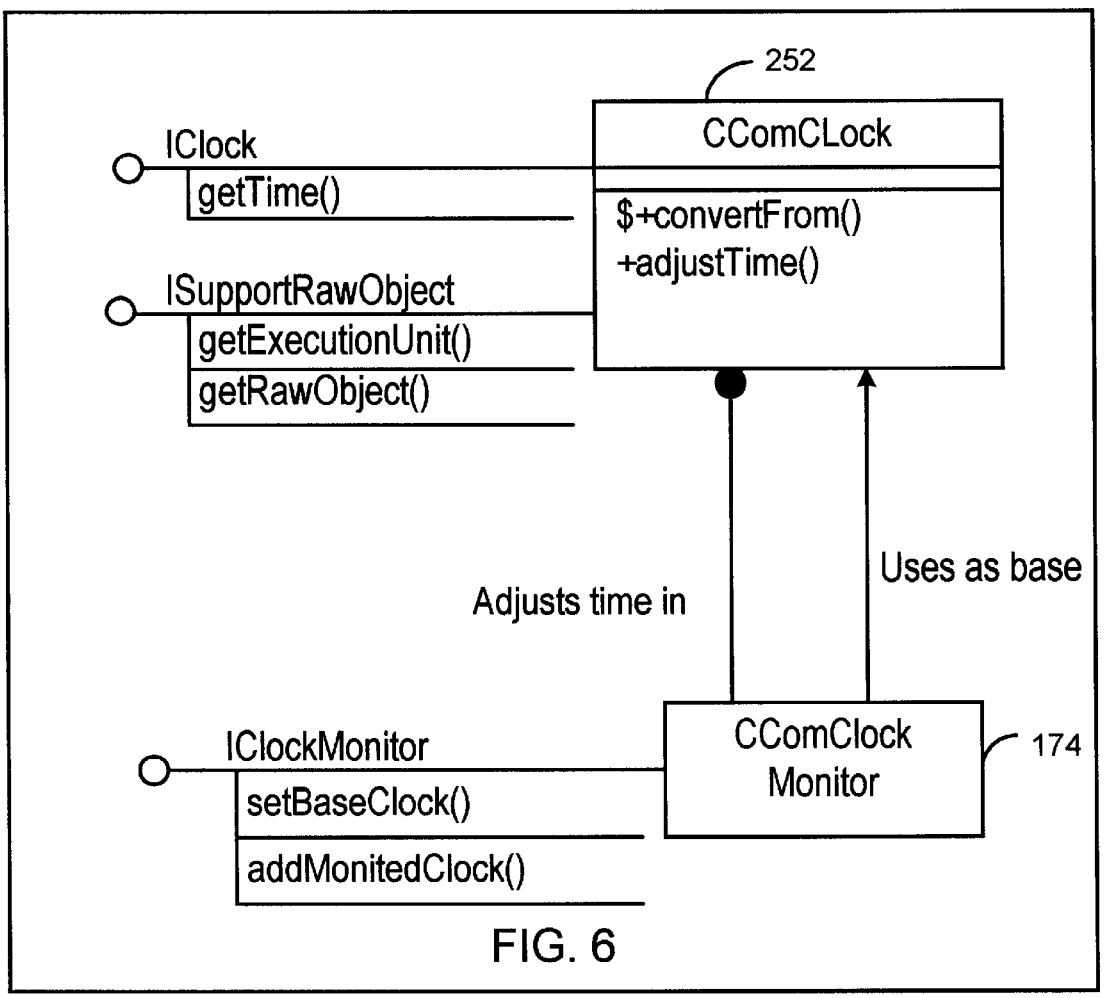
FIG. 6 is an object model diagram that illustrates COM to C++ type conversion using the casting method, in accordance with another embodiment of the invention.

FIG. 6 is an object model diagram that illustrates the casting method. Relative to the object model of FIG. 4, two additional elements are used to convert a COM object to its underlying C++ object through casting. The first element is a public, static method called convertFrom( ), which performs the conversion. Similar to the collection indexing method, CComClock::convertFrom( ) takes an IClock pointer as input and returns a CComClock pointer as output.

The second element necessary for the COM to C++ type conversion is a technique by which CComClock::convertFrom( ) obtains the C++ CComClock implementation object given an IClock interface. The technique has CComClock 252 supporting a COM interface called ISupportRawObject. The ISupportRawObject interface defines two methods. The first method, getExecutionUnit( ), returns the execution unit (e.g., a DLL or EXE element) that implements the COM object type. CComClock::convertFrom( ) uses ISupportRawObject::getExecutionUnit( ) to determine whether or not the COM object is implemented in the same execution unit as CComClock::convertFrom( ). One way in which it is determined whether the COM object is implemented in the same execution unit is set forth in the program code set forth below. This method validates the legality of the conversion.

The second method defined by ISupportRawObject is getRawObject( ). Based on an input parameter that indicates a desired C++ implementation type, ISupportRawObject::getRawObject( ) determines the viability of the conversion by checking whether or not the requested C++ implementation type exists in the C++ class hierarchy of the COM object. One way in which it is determined whether the implementation type exists in the C++ class hierarchy is set forth below in program code. Upon successful validation, ISupportRawObject::getRawObject( ) returns a pointer to the underlying C++ implementation object. Thus, CComClock::convertFrom( ) uses ISupportRawObject::getRawObject( ) to validate that the underlying C++ class hierarchy supports CComClock and to obtain a pointer to the raw C++ implementation object itself.

The Interface Definition Language (IDL) specification of ISupportRawObject may be considered challenging because IDL has no way to describe interface methods that exchange C++ data types. Even though IDL can't represent the transmission of C++ data types across interfaces, it does allow the passing of void pointers on interfaces and/or interface methods having the IDL local attribute. The IDL local attribute essentially relaxes the rules for parameter passing on COM interface methods. In addition, the IDL local attribute signifies to MIDL (the tool that compiles IDL) that no marshaling code should be generated for the given interface or interface method. Thus, the local attribute enforces the rule that prohibits marshaling. The following IDL defines the ISupportRawObject interface:

```
[
object,
uuid(. . .),
local
]
interface ISupportRawObject:IUnknown
{
    HINSTANCE getExecutionUnit( );
    void *getRawObject(REFGUID objectType);
};
```

In addition to its application-specific complement of COM interfaces, a COM object that supports conversion using the interface casting mechanism must support the ISupportRawObject interface. In essence, the ISupportRawObject interface becomes a contract between an object and its C++ class object. Below is the code for an example implementation of CComClock::convertFrom( ), CComClock::getExecutionUnit( ), CComClock::getRawObject( ), and a private, static utility method called CComClock::getObjectType( ).

```
CComClock *CComClock::convertFrom(IClock *pClock)
{
// Validate that the Clock supports conversion. The QueryInterface
// succeeds only if the Clock exposes ISupportRawObject, and the Clock
// conforms to Rule 1 for conversions - the interface must not have been
// marshaled. The IDL local attribute guarantees return of
// E_NOINTERFACE if QueryInterface provokes marshaling.
    ISupportRawObject *rawObjectSupport = NULL;
    HRESULT stat =
            pClock->QueryInterface(IID_ISupportRawObject,
            reinterpret_cast<void **>(&rawObjectSupport));
    if(FAILED(stat))
    {
        return NULL;
    }
// Validate Rule 2 for conversions. The legality of the conversion is
// determined by comparing module instances. The equality of module
// instances guarantees that the CComClock code will operate correctly
// against a cast interface pointer.
    CComClock *rawObject = NULL;
    if(rawObjectSupport->getExecutionUnit( ) == getExecutionUnit( ))
    {
        // All is well, request the raw C++ implementation object.
        rawObject = static_cast< CComClock
            *>(rawObjectSupport->getRawObject(getObjectType( )));
    }
    // Since QueryInterface implicitly does an AddRef( ),a corresponding
    // Release( ) is performed as per the COM specification.
    rawObjectSupport->Release( );
    return rawObject;
}
STDMETHODIMP_(HINSTANCE) CComClock::getExecutionUnit( )
{
    // Return the HINSTANCE of the local execution unit.
    return _Module.GetModuleInstance( );
}
STDMETHODIMP_(void*) CComClock::getRawObject(REFGUID
objectType)
{
// Make sure that the requested object type is that of a CComClock.
// If the input object is part of an
// inheritance hierarchy, the incoming objectType won't
// match that returned by getObjectType( ). If a match is not found,
// BaseClass::getRawObject( ) is invoked passing objectType. It is
// assumed that the base class will have its own version of
// getObjectType( ).
    if(objectType != getObjectType( ))
    {
        // Unsupported object type was requested. If CComClock
            was in an
        // inheritance hierarchy, BaseClass::getRawObject(
            // objectType) would be returned.
        return NULL;
    }
    // Caller is requesting a CComClock. "this" is a C++ keyword that
    // points to the object that is currently being worked on.
    return this;
}
const GUID &CComClock::getObjectType( )
{
    static const GUID objectType = {0x601e5a80, 0x1f67, 0x11d3,
        {0xad, 0xc6, 0x9c, 0x35, 0xaf, 0x0, 0x0, 0x0}};
    return objectType;
}
```

The CComClock::convertFrom( ) implementation set forth above consists of three major steps. The first step checks whether the COM object has been marshaled, the second step checks whether the conversion is legal, and the third step is getting the C++ object that implements the COM object if the first two steps succeed. In the first step, CComClock::convertFrom( ) checks whether the COM object has been marshaled by querying the input IClock interface pointer for ISupportRawObject. This query can fail for two reasons. The first reason is that the referenced COM object does not support ISupportRawObject. For example, a referenced COM object may be implemented with only the IClock interface and no ISupportRawObject interface.

The second reason the query can fail is due to marshaling. The IDL local attribute having been applied to the ISupportRawObject interface disqualifies it for marshaling. For example, assume that the input IClock interface pointer references a CComClock object supporting ISupportRawObject and that the referenced CComClock object is not owned by the thread calling QueryInterface( ) in CComClock::convertFrom( ). In this example, COM creates a proxy supporting ISupportRawObject. Using standard marshaling, COM attempts to find the DLL supporting the proxy implementation for the ISupportRawObject interface based on its interface identifier (IID) when the QueryInterface( ) method is executed. But because ISupportRawObject is a local interface, no DLL implementing the proxy for ISupportRawObject will be found. As a result, QueryInterface( ) will return E_NOINTERFACE. If the query for ISupportRawObject in CComClock::convertFrom( ) fails for any reason, CComClock::convertFrom( ) returns a NULL pointer, and no type conversion can occur.

If the query for ISupportRawObject in CComClock::convertFrom( ) succeeds, CComClock::convertFrom( ) performs the second step of checking the legality of the conversion. The legality check relies on ISupportRawObject::getExecutionUnit( ). ISupportRawObject::getExecutionUnit( ) returns the HINSTANCE (a unique identifier for a Win32 execution unit (DLL or EXE)) of the execution unit implementing the referenced COM object. In an ATL implementation, the HINSTANCE value of the execution unit is available through the global variable, _Module. The ATL infrastructure initializes _Module at execution unit load time with, among other things, the HINSTANCE of the local execution unit.

CComClock::convertFrom( ) compares the HINSTANCE value returned from the locally available _Module to the HINSTANCE value returned by ISupportRawObject::getExecutionUnit( ). If the values are equal, the CComClock code within the local execution unit supports the C++ object underlying the referenced COM object.

The third step performed by CComClock::convertFrom( ) is to attempt to get the C++ object that implements the referenced COM object. To obtain this C++ object, CComClock::convertFrom( ) calls ISupportRawObject::getRawObject( ), passing a GUID (Globally Unique Identifier) parameter that represents the desired class. A GUID is one way to uniquely identify a class, and those skilled in the art will recognize suitable alternatives. The GUID comes from a private, static utility method called getObjectType( ). The implementation of CComClock::getRawObject( ) compares its input GUID to the GUID returned from CComClock::getObjectType( ). If the two GUIDs are equal, CComClock::getRawObject( ) returns a pointer to the raw C++ implementation object, otherwise CComClock::getRawObject( ) returns NULL. CComClock::convertFrom( ) casts the resultant pointer to a CComClock pointer and returns it to the caller. Since the COM type system cannot represent C++ pointers, and getRawObject( ) as shown in the IDL returns a void pointer, the static_cast is used to turn the void pointer into an actual C++ object pointer of the correct type (CComClock).

Note that if CComClock 252 had been part of an inheritance hierarchy, CComClock::getRawObject( ) having failed the GUID comparison, would have returned the result of the call to its base class implementation of getRawObject( ). In this way, the correct C++ implementation object would be returned. Thus, the viability is checked by progressively calling up the inheritance hierarchy to determine whether any of the parent classes recognizes the GUID.

Two embodiments for implementing conversions of COM to C++ type conversions have been described. It will be understood that due to the effects of marshaling, COM to C++ type conversions cannot always be made. In general, COM to C++ type conversion makes sense only in single-apartment environments, either within one single-threaded apartment or more likely within the multi-threaded apartment.

The choice of conversion mechanism depends upon storage and scalability requirements of the application. In some situations, collections of COM objects are held as part of an application implementation. In this case, COM to C++ type conversion using the collection indexing mechanism may be suitable. However, the lock used in the collection indexing method limits the scalability of the application.

Generally, COM to C++ type conversion using the interface casting mechanism is more flexible than collection indexing. Interface casting does not possess the storage or scalability limitations of the collection indexing mechanism. Both methods, however, protect private interfaces from unauthorized clients.

Accordingly, the present invention provides, among other aspects, a method for converting a COM interface to the underlying C++ object. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for converting a COM object to an underlying C++ object by an execution unit, comprising:

initiating a conversion method by a first execution unit with reference to the COM object;

testing whether an interface proxy has been established for die COM object;

testing whether the COM object is implemented in the first execution unit; and if no interface proxy has been established and the COM object is implemented in the first execution unit, then returning a pointer to the C+C+ object that implements the COM object.

2. The method of claim 1, wherein the COM object is implemented as a first object of a C++ class having a public conversion method and a private registry attribute that maps an interface pointer of the COM object to an associated pointer to the first object.

3. The method of claim 1, wherein the COM object is implemented with a first public interface and a second raw interface for getting the pointer to the C++ object that implements the COM object.

4. A computer-implemented method for converting a COM interface object to an underlying C++ object by An execution unit, comprising:

instantiating a COM object having a first interface referenced with a first interface pointer and a raw interface, the COM object implemented as a first object of a C++ class having a public conversion method; and responsive an input to the conversion method of the first interface pointer, returning a resultant pointer to the first object if the COM object supports the raw interface, the raw interface has not been marshaled, and the execution unit that implements the COM object referenced by the first interface pointer is the same execution unit performing the conversion method.

5. The method of claim 4, further comprising implementing the raw interface as a local object.

6. The method of claim 5, further comprising:

obtaining a pointer to the raw interface; and comparing the execution unit of the raw interface to the execution unit performing the conversion method; and returning a null pointer if the execution unit of the raw interface is not equal to the execution unit performing the conversion method.

7. The method of claim 6, further comprising:

comparing object types of the object referenced by the input first interface pointer and an actual type of the first object of the ++ class.

8. The method of claim 7, further comprising casting the resultant pointer to the C++ class.

9. The method of claim 4, further comprising:

obtaining a pointer to the raw interface; and comparing the execution unit of the raw interface to the execution unit performing the conversion method; and returning a null pointer if the execution unit of the raw interface is not equal to the execution unit performing the conversion method.

10. The method of claim 4, further comprising:

comparing object types of the object referenced by the input first interface pointer and an actual type of the first object of the C++ class; and returning a null pointer if the object types are not equal.

11. The method of claim 4, wherein the raw interface includes a first method that return an identifier of an execution unit calling the first method and a second method that return a pointer to the first object.

12. The method of claim 4, further comprising casting the resultant pointer to the C++ class.

13. A computer-implemented method for converting a COM interface object to an underlying C++ object by an execution unit, comprising:

instantiating a COM object having a first interface pointer and implemented as a first object of a first C++ class having a public conversion method and a private registry attribute that maps an interface pointer of the COM object to an associated pointer to the first object; and responsive to an interface pointer of the COM object that is input to the conversion method, returning the associated pointer to the first object.

14. The method of claim 13, wherein the registry attribute is a type of registry class and further comprising:

instantiating a plurality of COM objects, each COM object implemented as a respective object of the first C++ class and having an associated interface pointer and implemented as objects of the first C++ class;

registering in one object of the registry class the interface pointers and associated pointers to the respective objects;

responsive to an input interface pointer of a COM object that is input to the conversion method, searching the registry for the input interface pointer; and returning the pointer to the C++ object that is associated with the input interface pointer if the input interface pointer was found in the registry.

15. The method of claim 14, wherein the one object of the registry class includes a lock-registry attribute.

16. The method of claim 15, further comprising setting the lock-registry attribute during access to the registry by an execution unit.

17. The method of claim 16, wherein each object of the first C++ class includes a register method and a deregister method, wherein the register method registers an interface pointer in the one object of the registry class responsive to an input interface pointer, and the deregister method removes an interface pointer from the one object of the registry class responsive to an input interface pointer.

18. The method of claim 17, further comprising returning a NULL pointer if the input interface pointer was not found in the registry.

19. The method of claim 14, further comprising returning a NULL pointer if the input interface pointer was not found in the registry.

20. An apparatus for converting a COM interface object to an underlying C++ object by an execution unit, comprising:

means for instantiating a COM object having a first interface referenced with a first interface pointer and a raw interface, the COM object implemented as a first object of a C++ class having a public conversion method; and means for returning a resultant pointer to the first object if the COM object supports the raw interface, the raw interface has not been marshaled, and the execution unit that implements the COM object referenced by the first interface pointer is the same execution unit performing the conversion method responsive an input to the conversion method of the first interface pointer.

21. An apparatus for converting a COM interface object to an underlying C++ object by an execution unit, comprising:

means for instantiating a COM object having a first interface pointer and implemented as a first object of a first C++ class having a public conversion method and a private registry attribute that maps an interface pointer of the COM object to an associated pointer to the first object; and means for returning the associated pointer to the first object responsive to an interface pointer of the COM object that is input to the conversion method.

* * * * *

UNITED STATES PATENT AND TRADEMARK OFFICE
CERTIFICATE OF CORRECTION

PATENT NO. : 6,721,942 B1  Page 1 of 1
DATED : April 13, 2004
INVENTOR(S) : Sievert It is certified that error appears in the above-identified patent and that said Letters Patent is hereby corrected as shown below:

Column 11,
Line 67, "die" should read -- the --.

Column 12,
Line 5, "C+C+" should read -- C++ --.
Line 17, "An" should read -- an --.
Line 42, "++" should read -- C++ --.
Line 58, "return" should read -- returns --.

Signed and Sealed this

Fifteenth Day of June, 2004

JON W. DUDAS
*Acting Director of the United States Patent and Trademark Office*